United States Patent [19]

Leung

[11] Patent Number: 5,293,300
[45] Date of Patent: Mar. 8, 1994

[54] PORTABLE COMPUTER WITH A DETACHABLE HANDLE INCLUDING A BATTERY

[75] Inventor: Chee-Chun Leung, Taipei, Taiwan

[73] Assignee: Quanta Computer, Inc., Taipei, Taiwan

[21] Appl. No.: 984,641

[22] Filed: Dec. 2, 1992

[51] Int. Cl.$^5$ .................... H05K 7/10; H05K 7/16; G06F 1/16
[52] U.S. Cl. .................... 361/683; 439/23; 439/500; 429/98
[58] Field of Search .................... 429/96–100; 16/110.5; 439/31, 18, 20, 23, 24–26, 28, 500; 364/708, 708.1; 361/380, 390–395, 399, 679–686, 724–727; 312/223.2

[56] References Cited

U.S. PATENT DOCUMENTS 4,926,365  5/1990  Hsieh .................... 364/708

*Primary Examiner*—Leo P. Picard
*Assistant Examiner*—Michael W. Phillips
*Attorney, Agent, or Firm*—Lowe, Price, LeBlanc & Becker

[57] ABSTRACT

A portable computer includes a computer body and a handle mounted detachably to the computer body. The computer body has a housing and an internal power unit mounted in the housing. The handle includes a handle casing, a pair of spaced and opposite arm members extending symmetrically from said handle casing and being mounted detachably and pivotally to said housing, a battery unit mounted in the handle casing, and an electrical connecting unit for connecting the battery unit to the internal power unit when the arm members are mounted to the housing.

4 Claims, 6 Drawing Sheets

PORTABLE COMPUTER WITH A DETACHABLE HANDLE INCLUDING A BATTERY

BACKGROUND OF THE INVENTION

1. Field of the Invention

This invention relates to a portable computer, more particularly to a portable computer with a detachable handle which has a battery unit mounted therein.

2. Description of the Related Art

A portable computer, such as a notebook computer or a laptop computer, has a relatively small volume and occupies a relatively small space. Generally, the portable computer has a main electric power unit which is mounted in a computer body thereof. Since only a main electric power unit is provided, the electrical energy developed to do work is limited, thereby resulting in a relatively short operating time. If an auxiliary electric power unit is mounted to the computer body of the portable computer in order to provide additional electrical energy, the volume of the computer body should be increased, thus creating an adverse effect to the occupied space of the portable computer.

SUMMARY OF THE INVENTION

Therefore, the objective of the present invention is to provide an improved portable computer with a handle. The handle is mounted detachably to a computer body of the portable computer and has a battery unit mounted therein so that additional electrical energy can be provided without increasing the volume of the computer body of the portable computer.

Accordingly, a portable computer of the present invention includes a computer body and a handle mounted detachably to the computer body. The computer body has a housing and an internal power unit mounted in the housing. The handle includes a handle casing, a pair of spaced and opposite arm members extending symmetrically from said handle casing and being mounted detachably and pivotally to said housing, and a battery unit mounted in the handle casing. The portable computer further includes an electrical connecting means for connecting the battery unit to the internal power unit when the arm members are mounted to the housing.

BRIEF DESCRIPTION OF THE DRAWINGS

Other features and advantages of the present invention will become apparent in the following detailed description of the preferred embodiment, with reference to the accompanying drawings, in which.

DETAILED DESCRIPTION OF THE PREFERRED EMBODIMENT

Figure 1:
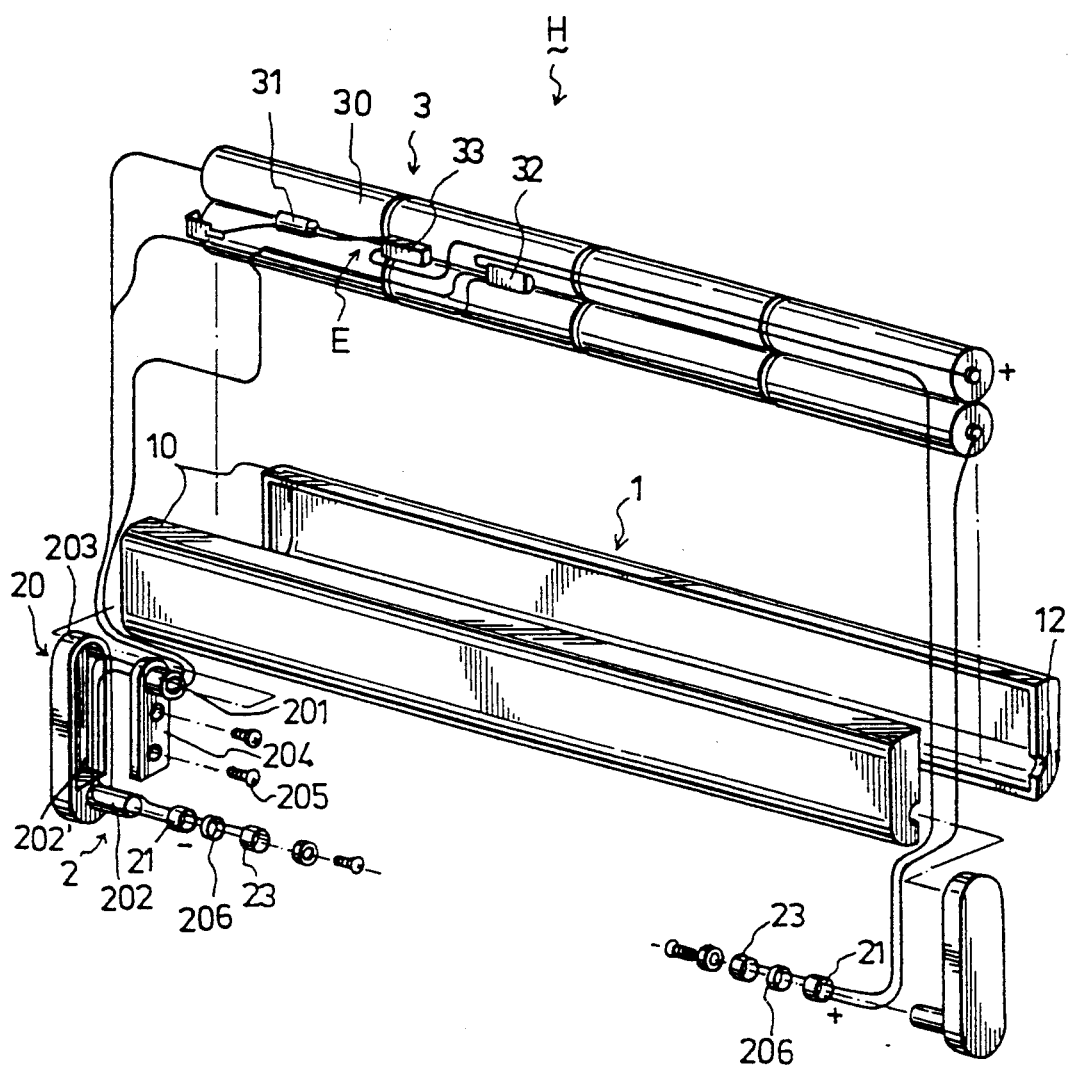
FIG. 1 is an exploded view of a handle of a portable computer of the present invention.
Figure 2:
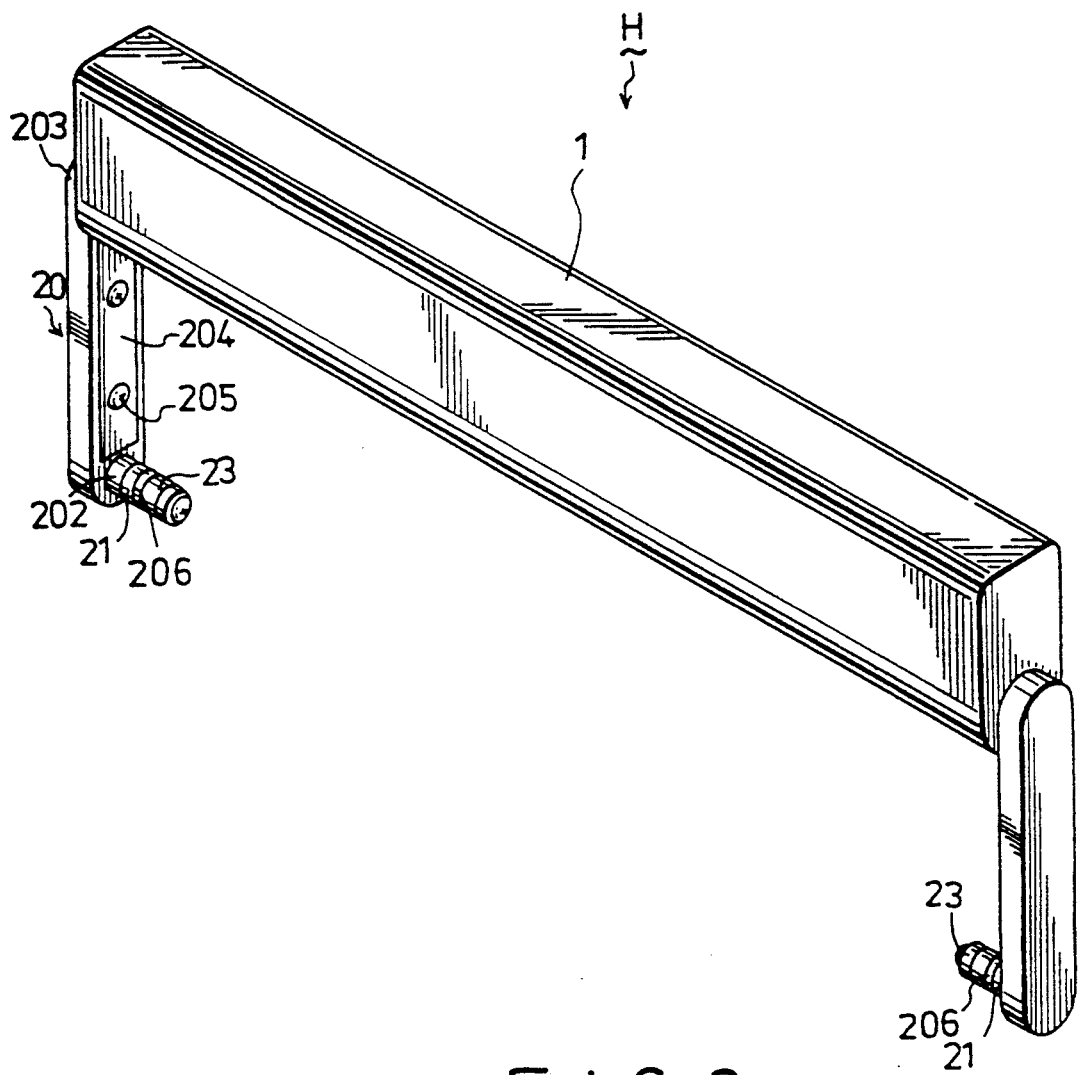
FIG. 2 is an assembled view of the handle of the present invention.
Figure 3:
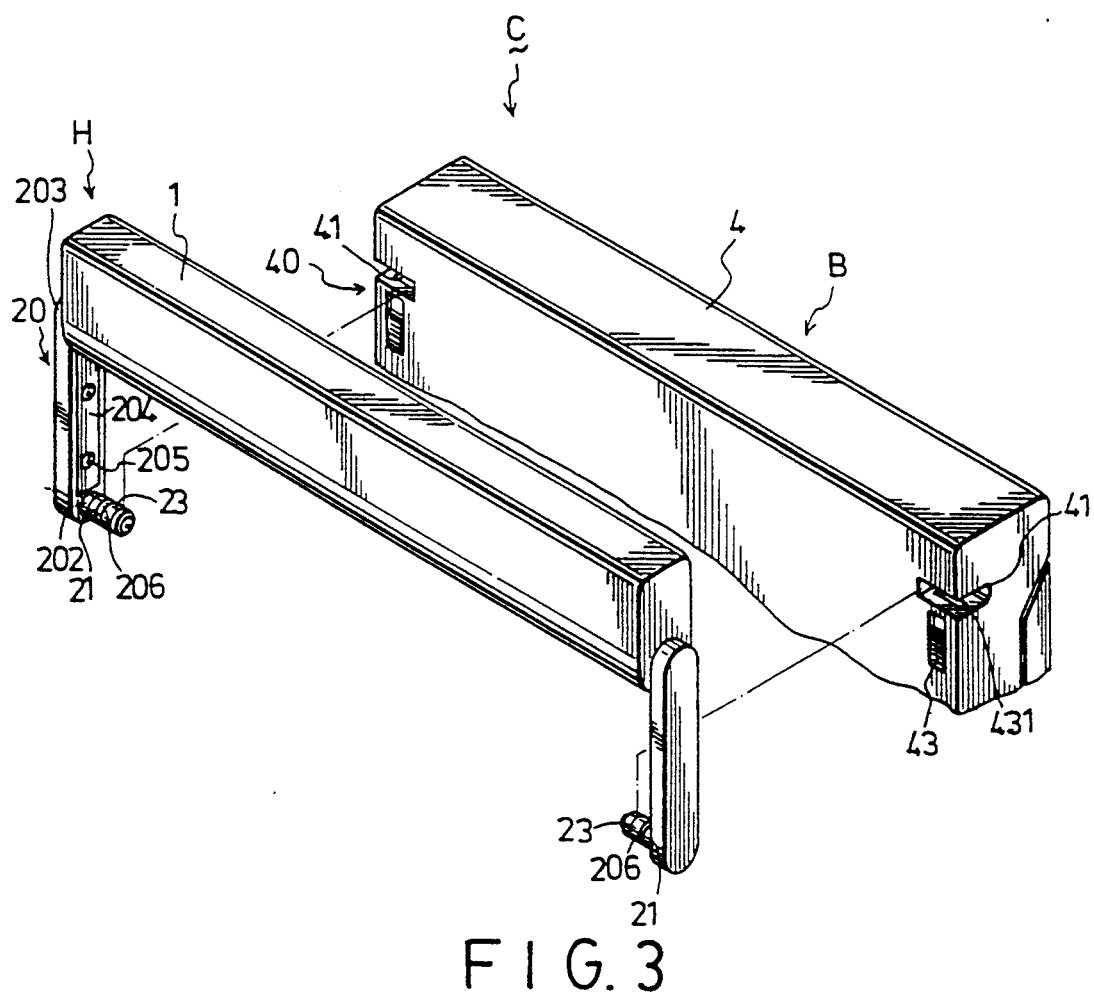
FIG. 3 is a schematic view showing how the handle is mounted on the computer body of the portable computer.
Figure 5:
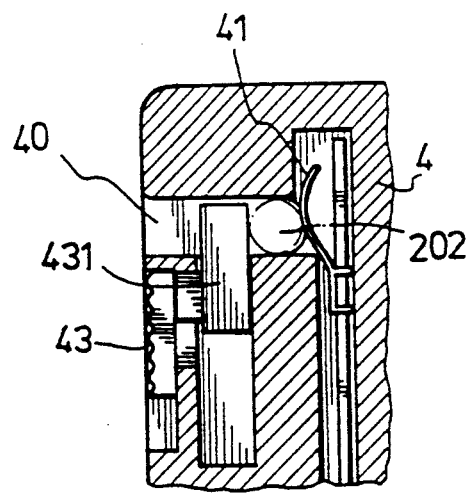
FIG. 5 is a sectional view showing the engagement between the handle and the computer body of the portable computer.
Figure 4:
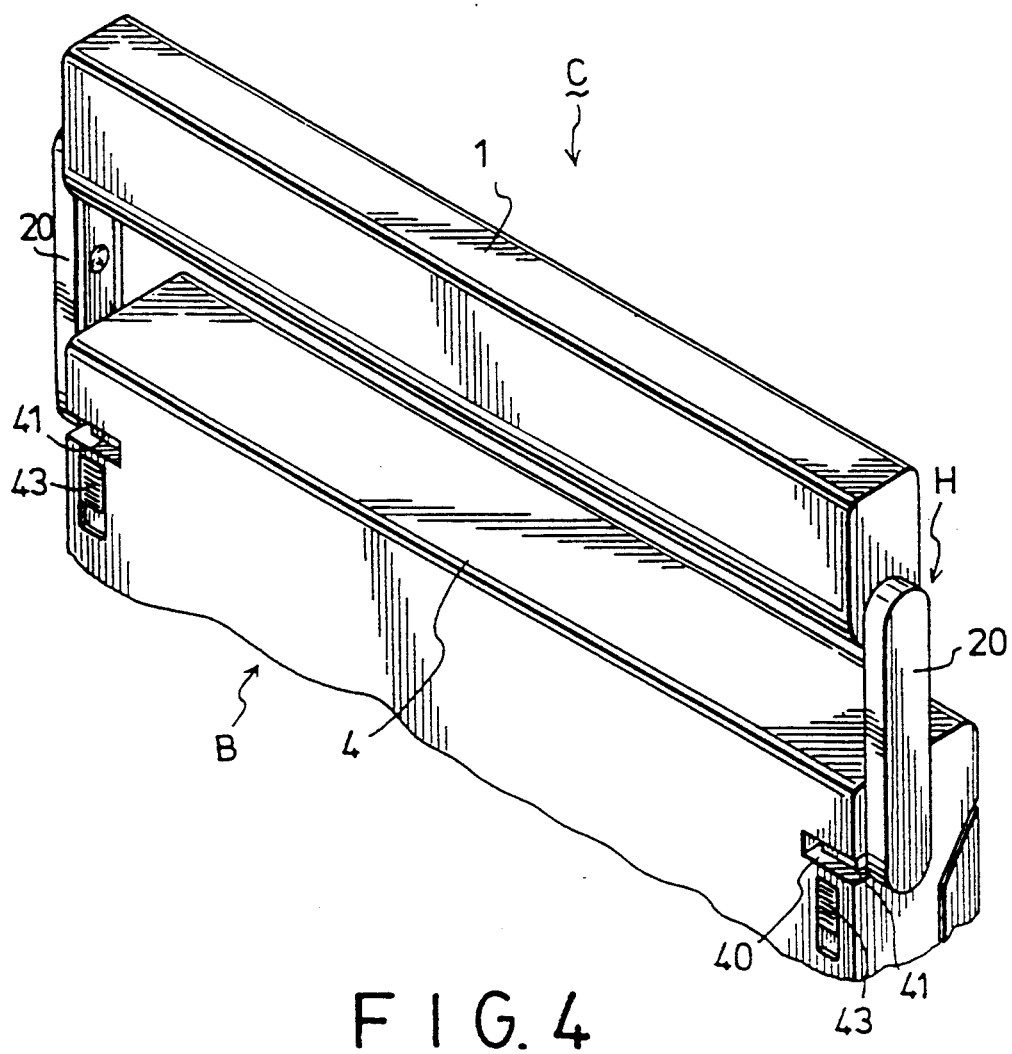
FIG. 4 is a schematic view showing the engagement between the handle and the computer body of the portable computer.
Figure 6:
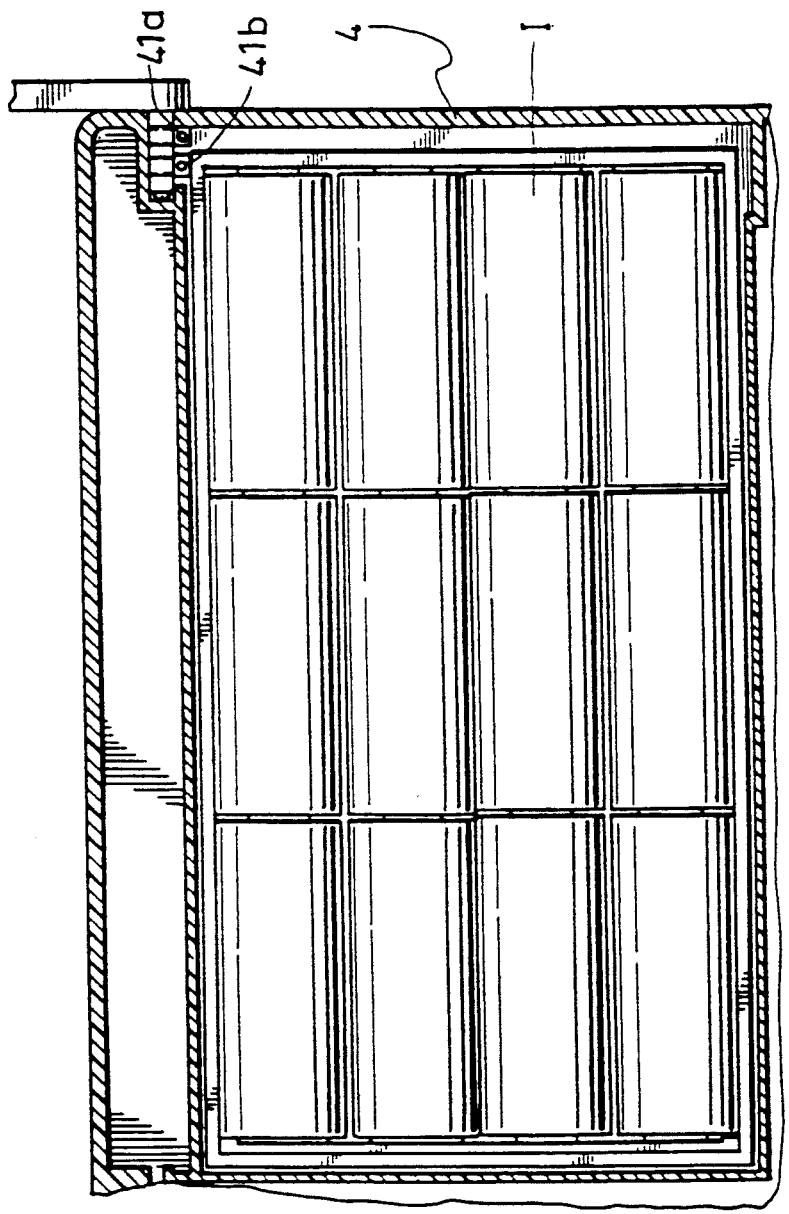
FIG. 6 is a sectional view illustrating the connection between third and fourth electrical contacts and an internal power unit.

Referring to FIGS. 1 to 6, a portable computer (C) of this invention includes a computer body (B) and a detachable handle (H). The computer body (B) has a housing (4), which has a pair of spaced recesses (40) formed symmetrically thereon, and an internal power unit (I) mounted in the housing (4). The handle (H) includes a handle casing (1) and a pair of arm members (20). The handle casing (1) has a pair of covering parts (10) which are interconnected to each other and which are formed with a pair of through holes (12). Each of the arm members (20) includes a first part (203) which has a pin (202) projecting therefrom so as to engage a respective one of the recesses (40) of the housing (4) and which defines a cavity (202'). Each arm member (20) further has a second part (204) which has a tubular stud (201) mounted thereon and which is received fixedly in the cavity (202') of the first part (203) by means of screws (205). The studs (201) engage the through holes (12) so that the arm members (20) are connected to the handle casing (1). A battery unit (3), which is mounted in the handle casing (1), includes storage cells (30) and an electric protective device (E). The electric protective device (E) includes a fuse (31) and a circuit breaker (33) which are in a series electrical connection with the storage cells (30). The electric protective device (E) further includes a temperature detector (32) which is mounted in the handle casing (1) adjacent to the storage cells (30). An electrical connecting means (2), which is used to connect the battery unit (3) and the internal power unit (I), includes a pair of first electrical contacts (21) which are sleeved respectively around the pins (202) of the arm members (20) and which are connected electrically and respectively to positive and negative terminals of the battery unit (3). The electrical connecting means (2) includes a pair of second electrical contacts (23) which are sleeved respectively around the pins (202) of the arm members (20) and which are connected electrically and respectively to the temperature detector (32). The second electrical contact (23) on each of the pins (202) is insulated from the first electrical contact (21) by means of an insulating member (206) which is provided therebetween. The electrical connecting means (2) further includes a pair of contact seats (41) which are mounted respectively in the recesses (40) of the housing (4). Each of the contact seats (41) has third and fourth electrical contacts (41a, 41b) which are connected electrically to the internal power unit (I). Each of the third and fourth electrical contacts (41a, 41b) may be formed as a conductive piece. The first electrical contacts (21) contact the respective third electrical contacts (41a), while the second electrical contacts (23) contact the respective fourth electrical contacts (41b) when the pins (202) of the arm members (20) engage detachably the recesses (40) of the housing (4).

Referring again to FIGS. 3 to 5, the computer body (B) has a pair of hand-operable slide members (43) mounted symmetrically in the housing (4) adjacent to the recesses (40). Each slide member (43) is slidable between an upper position and a lower position and has a protruding portion (431) which is extendible into one of the recesses (40) when the slide member (43) is disposed in the upper position so as to prevent the disengagement of the pin (202) from the respective recess (40).

Figure 7:
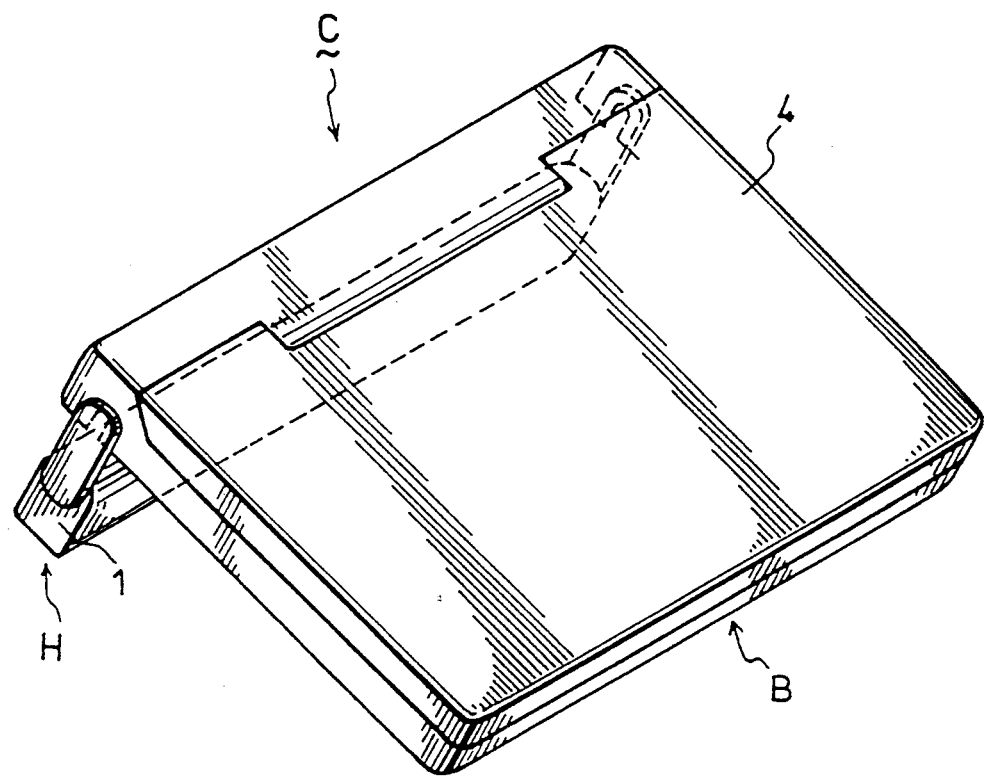
FIG. 7 is a schematic view illustrating the handle when turned relative to the computer body so as to support the same.

Referring to FIG. 7, the handle (H) may be turned with respect to the computer body (B) so as to support the latter on a desk (not shown) in order to facilitate the operation of the same.

The handle (H) is mounted to the computer body (B) when the pins (202) of the arm members (20) engage the recesses (40) of the housing (4) and when the slide members (43) are disposed in the upper position. The battery unit (3) is connected electrically to the internal power unit (I) in order to provide additional electrical energy so as to prolong the operating time of the portable computer (C). The handle (H) can be detached from the computer body (B) when the slide members (43) are disposed in the lower position and when the pins (202) of the arm members (20) are disengaged from the recesses (40) of the housing (4). It has thus been shown that the additional electrical energy can be provided by the battery unit (3) of the handle (H) without increasing the volume of computer body (B) of the portable computer (C). In addition, the handle (H) facilitates carrying of the portable computer (C).

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A portable computer including a computer body which has a housing and an internal power unit mounted in said housing, the improvement comprising;

a handle including a handle casing, a pair of spaced and opposite arm members extending symmetrically from said handle casing and being mounted detachably and pivotally to said housing, and a battery unit mounted in said handle casing; and means for connecting electrically said battery unit to said internal power unit when said arm members are mounted to said housing.

2. A portable computer as claimed in claim 1, wherein said housing of said computer body has two spaced recesses formed symmetrically thereon, each of said arm members having a pin which projects therefrom and which engages detachably and pivotally one of said recesses, said battery unit having a first terminal and a second terminal, said electrical connecting means including a pair of first electrical contacts which are sleeved respectively around said pins of said arm members and which are connected electrically and respectively to said first and second terminals of said battery unit, and a pair of contact seats which are mounted respectively in said recesses, each of said contact seats having a second electrical contact which is connected electrically to said internal power unit, first electrical contacts contacting respectively said second electrical contacts when said pins of said arm members engage said recesses so that said battery unit is connected electrically to said internal power unit.

3. A portable computer as claimed in claim 2, wherein said battery unit includes storage cells and an electric protective device, said electric protective device including a fuse and a circuit breaker which are in a series electrical connection with said storage cells.

4. A portable computer as claimed in claim 3, wherein said electric protective device further includes a temperature detector which is mounted in said handle casing adjacent to said storage cells, said electrical connecting means further including a pair of third electrical contacts sleeved respectively around one of said pins of said arm members and insulated from a respective one of said first electrical contacts, said third electrical contacts being connected electrically and respectively to said temperature detector, each of said contact seats further having a fourth electrical contact which is connected electrically to said internal power unit, said third electrical contacts contacting said fourth electrical contacts when said pins of said arm members engage said recesses of said housing of said computer body.

* * * * *